US007359903B2

(12) United States Patent
Lin et al.

(10) Patent No.: US 7,359,903 B2
(45) Date of Patent: Apr. 15, 2008

(54) SYSTEM AND METHOD OF PIPELINE DATA ACCESS TO REMOTE DATA

(75) Inventors: Yun Lin, Kirkland, WA (US); Balan Sethu Raman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 220 days.

(21) Appl. No.: 11/252,684

(22) Filed: Oct. 17, 2005

(65) Prior Publication Data

US 2006/0047677 A1    Mar. 2, 2006

Related U.S. Application Data

(63) Continuation of application No. 10/003,137, filed on Nov. 15, 2001, now Pat. No. 6,957,219.

(51) Int. Cl.
*G06F 17/30* (2006.01)
(52) U.S. Cl. .................. 707/10; 709/203; 709/217
(58) Field of Classification Search ............. 707/200, 707/10; 709/203, 217
See application file for complete search history.

(56) References Cited

U.S. PATENT DOCUMENTS

| 5,682,478 A | 10/1997 | Watson et al. ............ 709/229 |
| 5,812,784 A | 9/1998 | Watson et al. ............ 709/227 |
| 5,941,954 A | 8/1999 | Kalajan .................... 709/239 |
| 5,974,444 A | 10/1999 | Konrad .................... 709/203 |
| 6,044,367 A * | 3/2000 | Wolff ...................... 707/2 |
| 6,823,429 B1 * | 11/2004 | Olnowich ................. 711/141 |
| 6,856,993 B1 * | 2/2005 | Verma et al. ............ 707/101 |
| 2002/0147645 A1 | 10/2002 | Alao et al. ............... 705/14 |
| 2003/0195997 A1 | 10/2003 | Ibert et al. ............... 709/318 |

FOREIGN PATENT DOCUMENTS

JP     02035541 A *  2/1990

OTHER PUBLICATIONS

Greco, Frank D., Redirection, or "They Went That-away", Programmer's Journal, vol. 5, No. 1, Jan.-Feb. 1987, pp. 24-35.
Purakayastha, Apratim et al., "ENWRICH: A Compute-Processor Write Caching Scheme for Parallel File Systems", Department of Computer Science, Duke University, Oct. 19, 1995, pp. 1-26.
W. Richard Stevens, "TCP/IP Illustrated, Vo. 1: The protocols", Addison Wesley, Dec. 15, pp. 600.

* cited by examiner

*Primary Examiner*—Ramesh B. Patel
*Assistant Examiner*—Alexey Shmatov
(74) *Attorney, Agent, or Firm*—Workman Nydegger (57) ABSTRACT

A pipeline I/O mechanism in a network redirector that breaks up large files into sections, and sends write (or read) requests for each section in a pipeline fashion to a network file server, without waiting for a response for a previously-sent section. The pipeline I/O mechanism tracks the returned status of each section for which a request was made, so that success or failure of the request is determined as a whole. The pipeline I/O system and method dramatically increase the performance of network remote I/O operations, particularly with file write operations directed to a file on a network file server.

15 Claims, 7 Drawing Sheets

SYSTEM AND METHOD OF PIPELINE DATA ACCESS TO REMOTE DATA

The present invention is a continuation of U.S. patent application Ser. No. 10/003,137 filed Nov. 15, 2001, now U.S. Pat. No. 6,957,219, and herein incorporated by reference.

FIELD OF THE INVENTION

The present invention relates generally to computers and networking, and more particularly to file server data access.

BACKGROUND OF THE INVENTION

Network data storage is a concept that has been around for a relatively long time in computing standards. One way to store files to a network server's storage uses the SMB (server message block) or CIFS (Common Internet File System) transport protocol, wherein CIFS is a subset of the SMB protocol. In general, as applications and other components at a client machine request input-output (I/O) operations to network files on an SMB server, an SMB redirector at a client machine redirects the I/O requests to the SMB server using the SMB and/or CIFS protocols. The SMB server receives the transmission, unpacks the request, and converts the request as necessary to request a corresponding I/O operation via its own local file system. Once the local file system completes the request, the SMB Server sends the result back to the client redirector, which returns a corresponding result to the application. From the perspective of the application program that made the request, the SMB file server thus appears to be like any local storage device, and applications can even access files on the network server via a drive letter mapped to an SMB server.

The SMB Server is designed to serve multiple clients concurrently. In order to be fair and efficient, the SMB server limits the resources that each client can take. For example, the SMB Server typically sets the maximum buffer size for read and write I/O requests to 64 kilobytes. If a client requests to write a file having a size that is larger than the maximum write buffer size, the SMB Redirector separates the file data into multiple requests and sends them to the server, one at a time. There is also a maximum number of requests a client can send to an SMB server at any time.

The redirector is an important component to networking operations, and the performance of the redirector affects the performance of the overall system. With large network files, the redirector/network level becomes a bottleneck for data communication, particularly when writing to a network file server. Any improvement in overall data throughput is thus highly sought after.

SUMMARY OF THE INVENTION

Briefly, the present invention provides a system and method that dramatically increase the performance of network remote I/O operations, particularly file write operations directed to a file on a network file server. To this end, a network redirector includes a pipeline I/O mechanism that breaks up large files into sections, and sends write (or read) requests for each section in a pipeline fashion to a network file server, without waiting for a response for a previously-sent section. The pipeline I/O mechanism tracks the returned status of each section for which a request was made, so that success or failure of the request is determined as a whole.

In general, the total amount of time to send an entire file is the time spent on the first request plus the latency of the other requests that are needed. Because remote file systems frequently deal with burst traffic, most of the time a file server operates in an idle state, or a state of low workload. The present invention enables the file server to service multiple requests in parallel for the same file. In one recent experiment using a relatively fast network connection and a powerful server, a redirector configured with a pipeline write mechanism boosted non-buffered write performance approximately one-thousand percent relative to a non-pipeline write redirector. Note that a redirector can be configured with an equivalent or similar pipeline read mechanism to improve the performance when reading data from a file server.

Other advantages will become apparent from the following detailed description when taken in conjunction with the drawings, in which:

DETAILED DESCRIPTION

Exemplary Operating Environment

Figure 1:
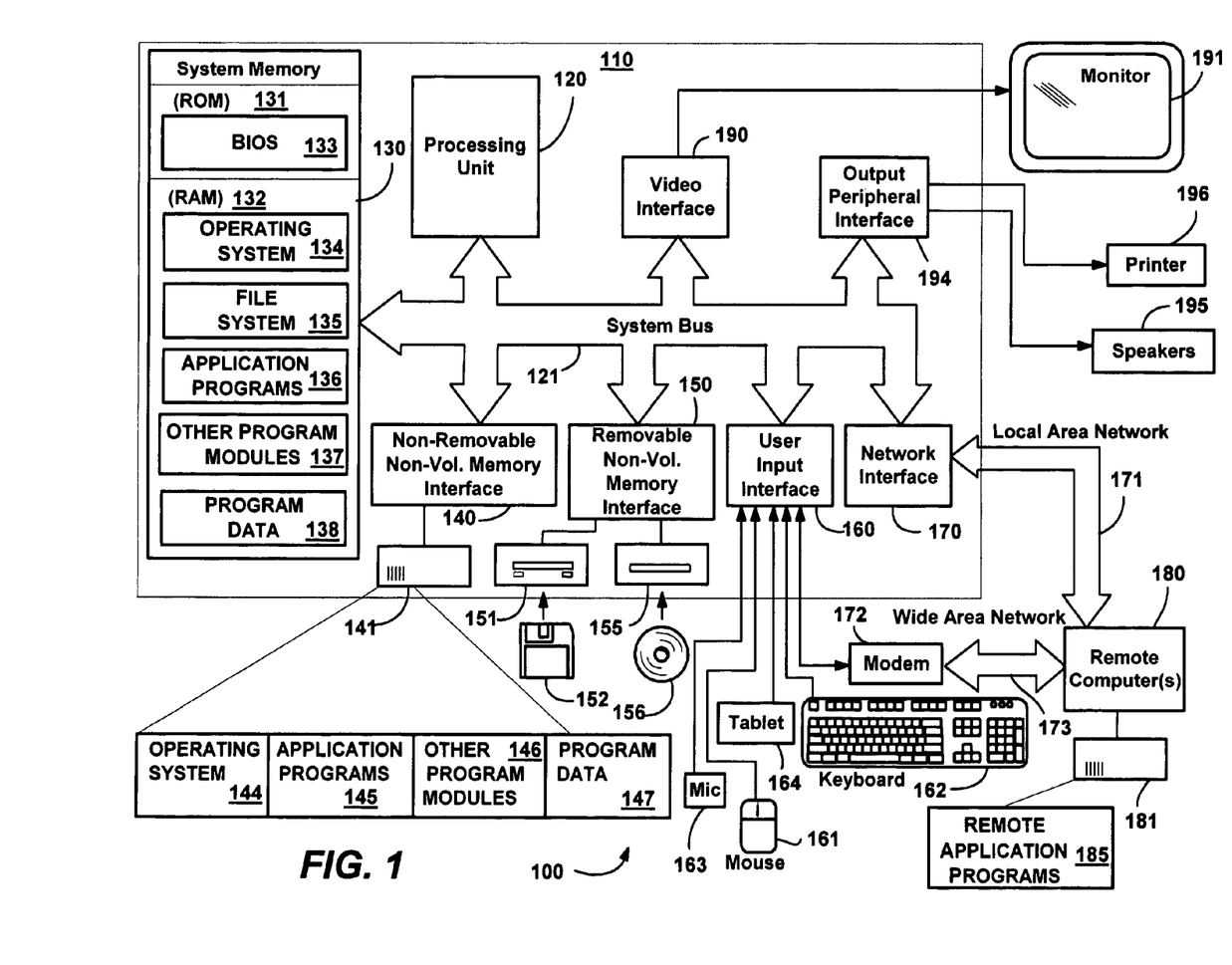
FIG. 1 is a block diagram representing an exemplary computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, file system 135, application programs 136, other program modules 137 and program data 138.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs. 145, other program modules 146 and program data 147. Note that these components can either be the same as or different from operating system 134, application programs 136, other program modules 137, and program data 138. Operating system 144, application programs 145, other program modules 146, and program data 147 are given different numbers herein to illustrate that, at a minimum, they are different copies. A user may enter commands and information into the computer 110 through input devices such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Redirected Pipeline I/O

The present invention will be generally described in the context of Microsoft Corporation's Windows® XP operating system and the SMB and/or CIFS protocols. Notwithstanding, it can be readily appreciated that the present invention may be implemented with virtually any operating system and/or protocol.

Figure 2:
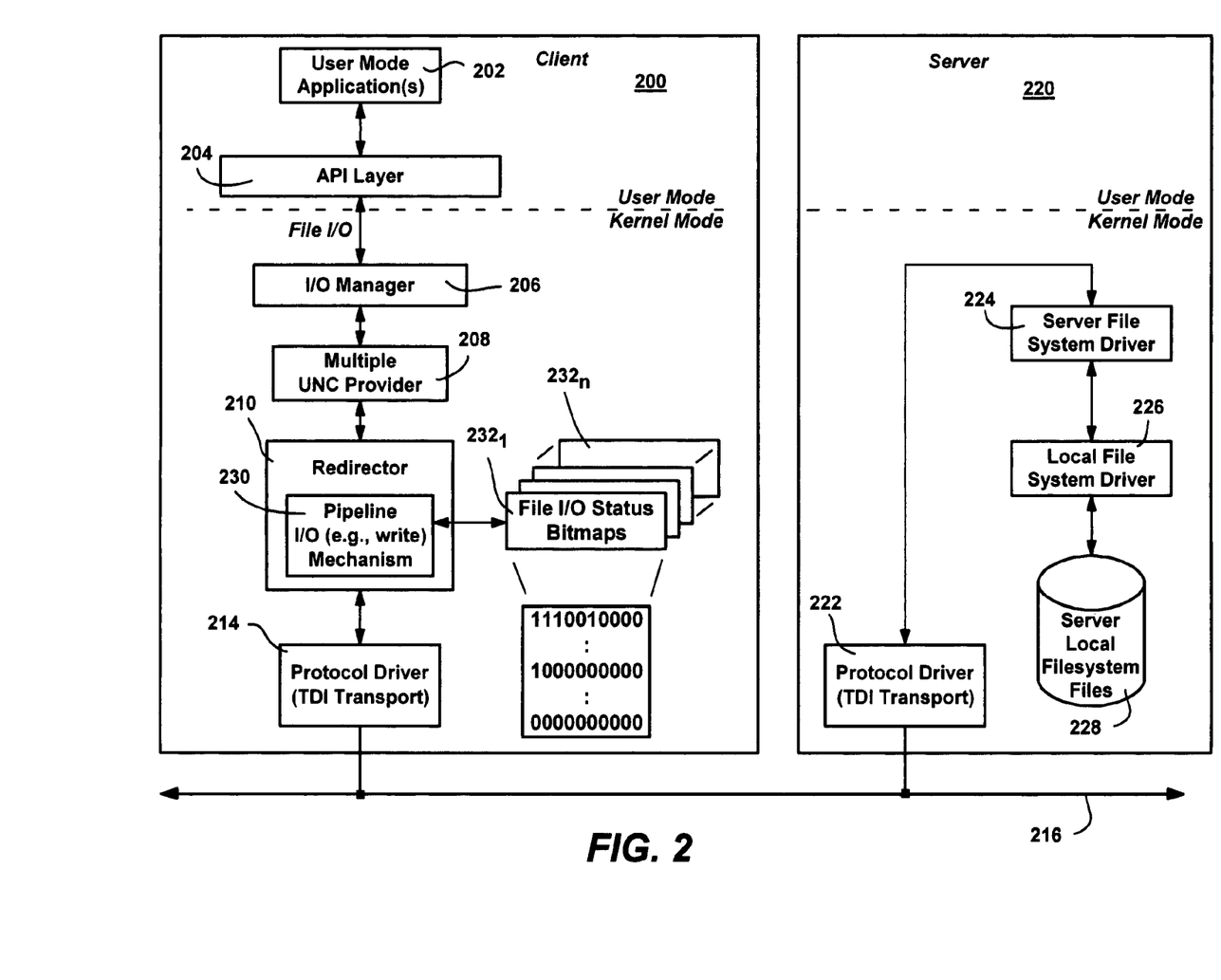
FIG. 2 is a block diagram generally representing components for implementing aspects of pipeline I/O (e.g., write) with respect to a file server data access in accordance with the present invention.

Turning to FIG. 2 of the drawings, there is shown a client machine 200 (such as corresponding to the computer system 110 of FIG. 1) including at least one user mode application program 202, which requests various system functions by calling application programming interfaces (APIs) 204. For accessing files stored on a remote network server 220 (e.g., a file server such as the remote computer(s) 180 of FIG. 1), the application 202 places file input output (I/O) API calls directed to a network resource to an API layer 204. For example, applications can examine or access resources on remote systems by using a UNC (Uniform Naming Convention) standard with Win32 functions to directly address a remote resource, e.g., in the form \\server\share, or via a drive mapped to a network shared folder or the like.

When a file I/O API (e.g., a file open or create request) is called with a remote filename such as a UNC name, a file I/O request is received at an I/O manager 206. To handle the remote name, the I/O manager 206 calls a Multiple UNC Provider, or MUP 208 to figure out which device handles the name. In other words, the MUP 208 (e.g., comprising a kernel mode driver) determines which network to access when an application 202 uses an I/O API to open a remote file.

More particularly, to determine a device that can handle the given name, the MUP 208 polls (via asynchronous I/O request packets, or IRPs) any redirectors that have previously registered with the MUP, e.g., the redirector 210 in FIG. 2. Each redirector that can handle the name responds back affirmatively, and if more than one respond, the MUP 208 determines from a priority order (e.g., maintained in at least one system registry key or the like) which one has precedence to handle the request. In one implementation, the SMB (server message block) and/or CIFS (Common Internet File System) redirector 210 defaults to having first precedence in handling UNC requests. The SMB and/or CIFS redirector(s), along with IRPs and the I/O manager are generally described in the reference, Inside Microsoft® Windows® 2000, Third Edition, D. Solomon and M. Russinovich, Microsoft Press (2000).

As part of the response to the MUP 208, each redirector that recognizes the name indicates how much of the name is unique to it. For example, if the name is the UNC name \\SERVER\SHARE\foo\bar1.doc, the SMB redirector 210 recognizes the name as capable of being handled, and if the server is an SMB server, responds by claiming the string "\\SERVER\SHARE" as its own.

When at least one redirector (e.g., the redirector 210) responds and provides the caching information, the MUP driver 208 caches the information in association with the redirector that responded, (if more than one, it caches the information of the one that takes precedence), whereby further requests beginning with that string are sent directly to that redirector 210, without the polling operation. For example, if the redirector 210 comprises an SMB redirector, future SMB requests directed to a network share corresponding to a cached string are passed to the redirector 210, which then packages those SMB requests into a data structure that can be sent across the network to that remote SMB server. Note that if inactive for too long, the string information will expire in the cache, whereby polling will again be necessary.

In one implementation, the redirector 210 is a kernel mode component that provides I/O requests to a remote file server 220 via a protocol driver (e.g., TDI transport) 214 connected to a communications link 216. The file server 220 receives the I/O requests at a counterpart protocol driver 222, and passes them to a server file system driver 224, which accordingly operates via a local file system driver 226 (e.g., FAT or NTFS) on its local file system files 228.

In accordance with one aspect of the present invention, file I/O is performed via a pipeline technique rather than in a series of I/O requests. To this end, the redirector 210 includes or is otherwise associated with a pipeline I/O mechanism 230, which sends sectioned (partial) I/O requests for large amounts of file data (e.g., larger than the negotiated maximum buffer size) in a pipeline fashion, as described below. The pipeline I/O mechanism 230 maintains a file I/O status array of entries (e.g., bitmap) to track the status of each separate request.

Because there may be many files open concurrently, FIG. 2 represents a number of such bitmaps $232_1$-$232_n$ being maintained at any given time. However, for purposes of simplicity, the present invention will be primarily described with respect to the data of a single file being written to a network server file, although as is understood, the present invention applies to multiple files and also to file read operations.

Figure 3:
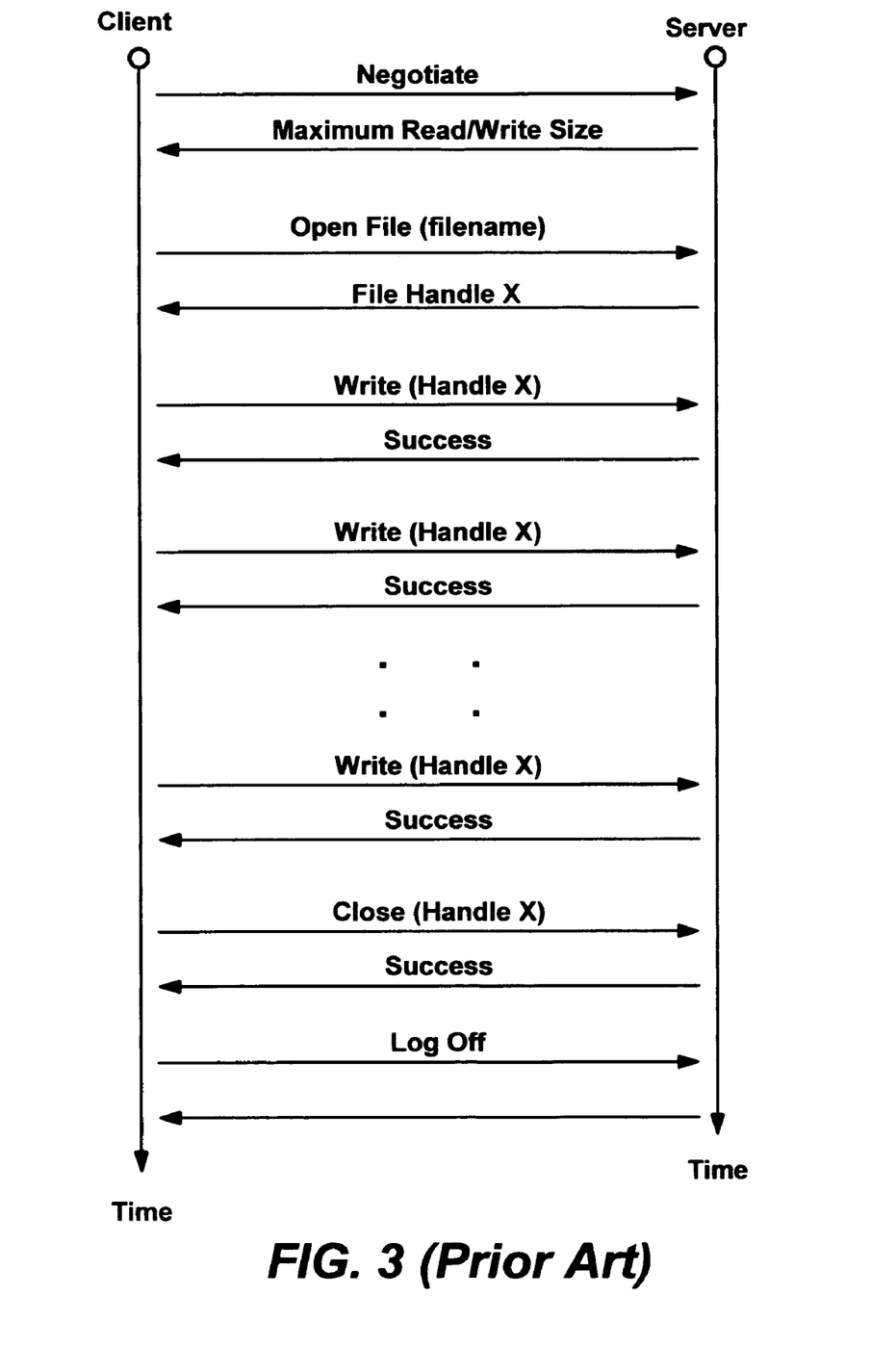
FIG. 3 comprises a timing diagram representing non-pipeline file write operations according to the prior art.

As generally represented in FIG. 3, prior redirectors write large files (or sections thereof) by dividing up the files into a series of writes of up to the negotiated buffer size, e.g., negotiated at log on. Following the open file request, a write is sent with the returned file handle. Success is required before the next write is sent, keeping the redirector process as non-complex as possible. When the writes are finished, e.g., with no error having occurred, the file is closed. The client may log off when no files remain open.

Figure 4:
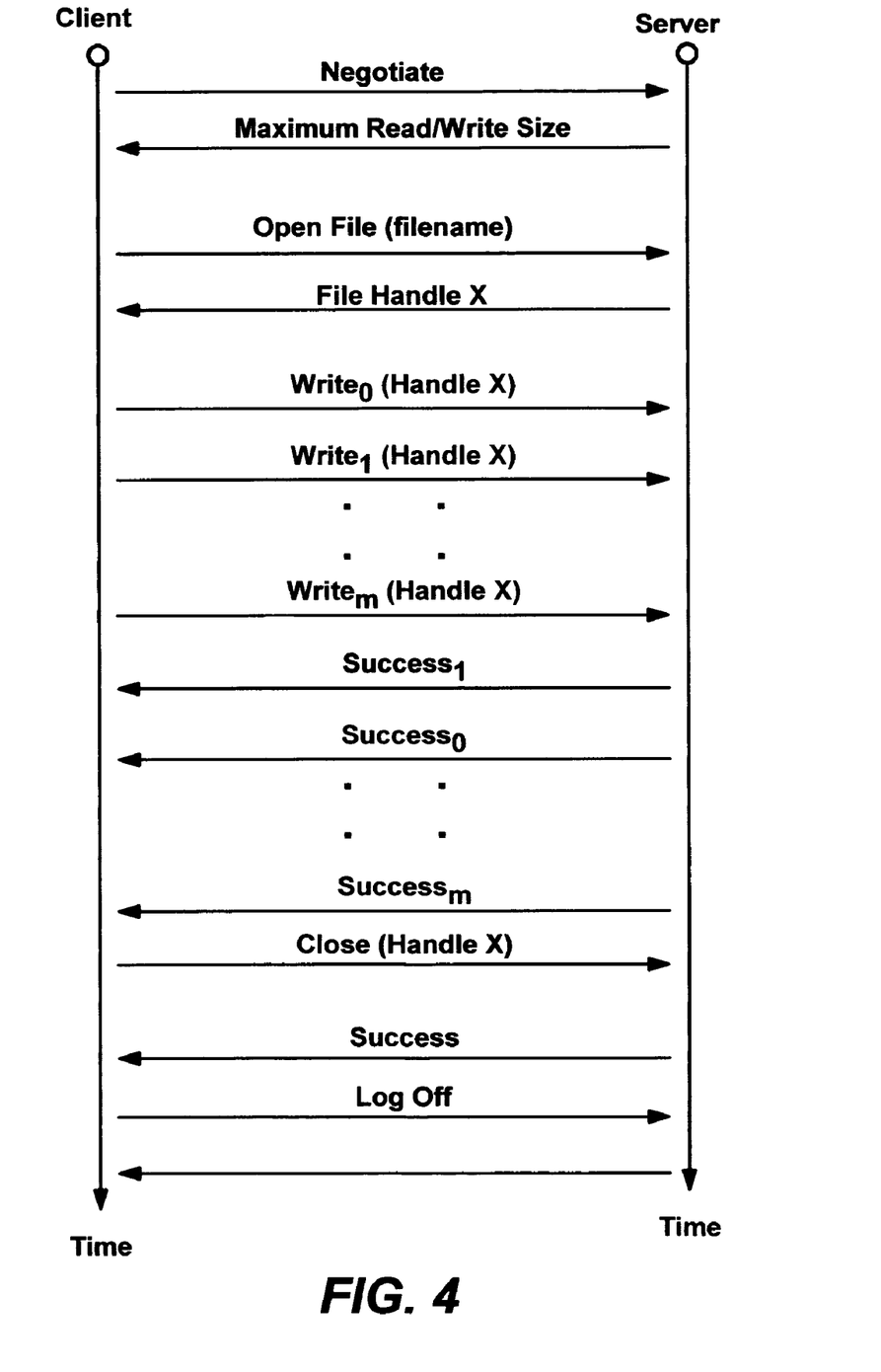
FIG. 4 comprises a timing diagram representing pipeline file write operations in accordance with an aspect of the present invention.

As generally represented in FIG. 4, the redirector 210 of the present invention negotiates the buffer size, opens a file on the network file server for I/O like prior redirectors, and for large files divides the data into sections of (up to) the maximum buffer size. However, unlike prior systems, the redirector 210 including the pipeline I/O (e.g., write) mechanism 230 sends each request in a pipeline fashion, one after the other, as allowed by the server, (e.g., to comply with the maximum number of requests a client can send to the SMB server at any time).

In accordance with another aspect of the present invention, because multiple requests for the same file are outstanding, the pipeline I/O mechanism 230 identifies each I/O request relative to others in order to track its status information that is returned in a corresponding response. To this end, in one implementation, the pipeline I/O mechanism 230 tags the I/O request (e.g., in an SMB header field that will be returned) with a position (e.g., sequence) number that identifies which section of the file is being written in the request.

Figure 5:
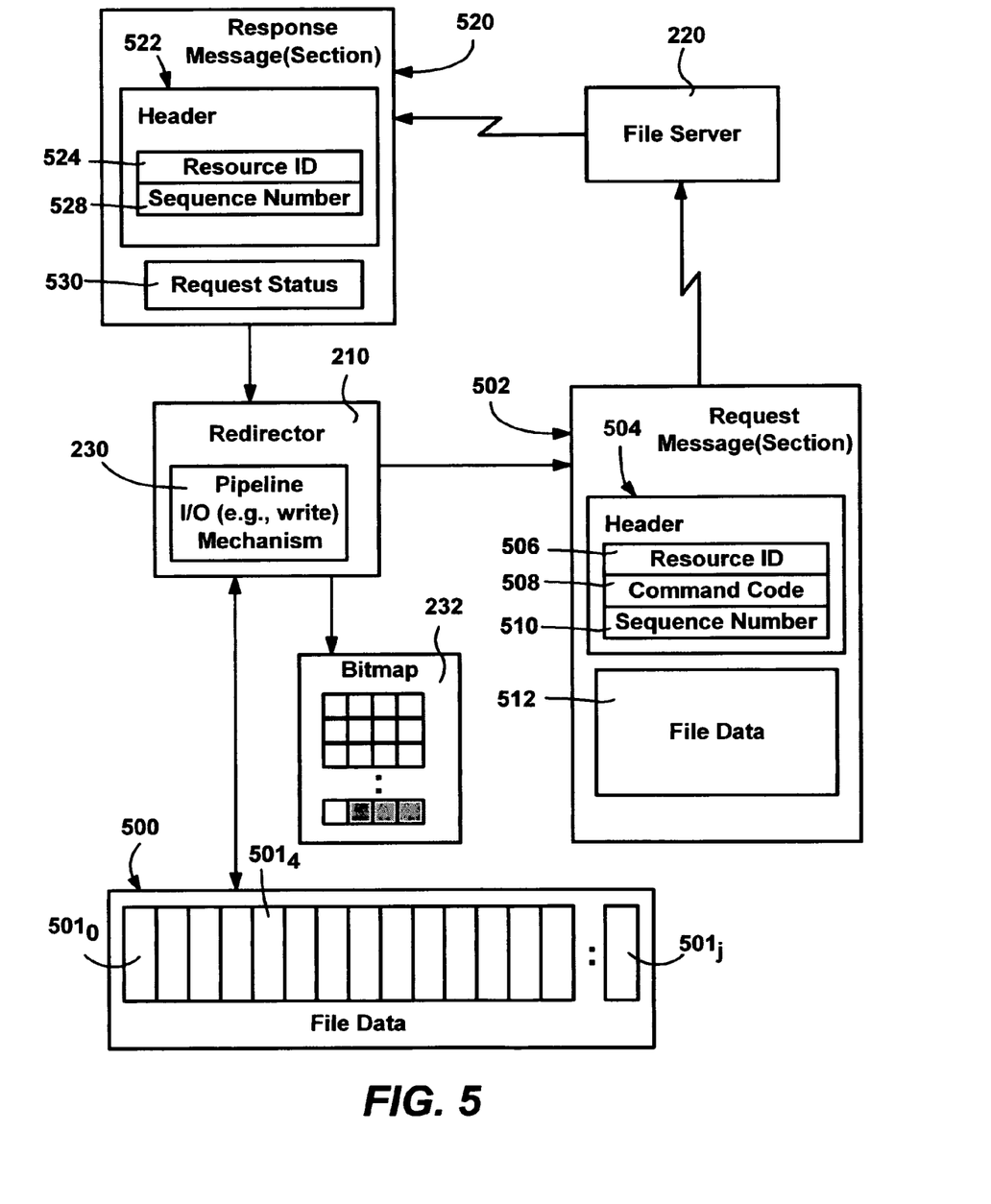
FIG. 5 is a block diagram generally representing a pipeline I/O mechanism associated with a network redirector in accordance with the present invention.

More particularly, as generally represented in FIG. 5, file data 500 to be written is logically divided into file request sections $501_0$-$501_j$ by the redirector 210, each section typically equal to the maximum allowed buffer size, (except possibly the last section containing the remainder). The pipeline write mechanism 230 allocates an array such as a bitmap 232 for tracking the status of each section, one bit for each section $501_0$-$501_j$. In general, the bitmap 232 is allocated based on the number of bits required to represent the number of sections of the file 500, based on the amount of file data to transmit divided by the maximum buffer size. Of course the bitmap may be larger than needed, such as for allocation purposes, e.g., to request allocation of some number of bytes rather than the exact number of bits needed, as represented in FIG. 5 by the shaded extra bits. Note that instead of a bitmap, a counter could be used (e.g., requests sent minus successful responses received) to track status, if there was a guarantee that each request would only need to be sent once and would result in exactly one response being received therefor. As will be understood, however, the bitmap eliminates such constraints.

When the redirector sends a file section (e.g., the file section $501_4$ in a section request message 502), the request message 502 includes a message header 504. The message header 504 may include data such as the resource identifier (e.g., corresponding to a file handle) or the like in field 506, an instruction (e.g., to write the data) corresponding the command code in field 508, and a sequence number in a field 510, with a value set by the pipeline write mechanism 230 to correspond to the section's position and/or sequence (e.g., 4) relative to the other data sections. Note that the sections do not have to be sent in any particular order. For a write request, the file data (e.g., from the section $501_4$) is sent as the payload in field 512 when the request message 502 for this section of the file is sent to the file server 220.

Note that the mechanism represented in FIG. 5 presumes that the response from the server includes the same sequence number sent in the request. However, other ways of correlating a returned response with a given file section may be employed. For example, in any protocol that provides a response to a request, the response needs to be related to the request in some way, such as by an identifier or sequence number (one that does not necessarily correspond to the file section's position). Before sending, such an identifier or sequence number can be mapped by the client or to the file section's position, whereby the later response can be correlated to the position. For simplicity, the present invention will be described with the request and response messages including the section position data as a sequence number, such that the position data can be directly read from the response.

To track the returned status, the pipeline I/O mechanism updates the bitmap 232 at each location corresponding to the position number of a successful response. Thus, in FIG. 5, a response 520 indicates in its header 522 that status information is available for the file with this resource identifier (in field 524) and with the sequence number (position tag) for this section (in field 528). Note that the server message handling code need not be modified to deal with separate sections, as long as the file position data is placed in a field that the server returns unmodified. However, the server may be enhanced to deal with pipeline writes, such as by being informed that request messages are part of a pipeline write, or otherwise detecting such a condition, to improve its efficiency. For example, a server that knows a pipeline write is in progress can cache the data from multiple messages and thereby need to request less writes to its file system with larger amounts of data per write than the maximum buffer size, return a special single status response for multiple messages that the pipeline write mechanism at the client knows how to interpret, and so on. However, for purposes of simplicity, the server will be described as operating without knowledge of the pipeline write.

The server thus returns an appropriate response for each request received. If the response indicates an error occurred, such as if the disk is full, the pipeline write mechanism/process does not request any further write operations for this file, and immediately returns appropriate status information to the I/O manager back to the application. If no response is received for a message, (including any retries), a timeout error (e.g., server not responding) will occur. This will also halt the write process for this file and result in an appropriate message being returned to the application program.

In typical cases, each section of the file will be successfully written to the server, whereby each bit in the bitmap will indicate success. When the bitmap indicates that all requests have been successfully responded to, the redirector returns a success to the application program. Note that the pipeline write is generally directed to non-buffered I/O, since buffered I/O tends to immediately return a success when cached, even though the buffer contents have not been flushed to the disk and an error may still occur.

In one implementation, each bit in the bitmap that represents an actual section is initially set to one (with any unneeded bits at the end cleared to zero). Then, as responses indicating success are received, the bit at the position corresponding to the success are cleared to zero. In this manner, a simple compare to zero operation, which processors perform efficiently, indicates whether all of the responses have been successfully received, regardless of the size of the file and its corresponding bitmap.

Figure 6:
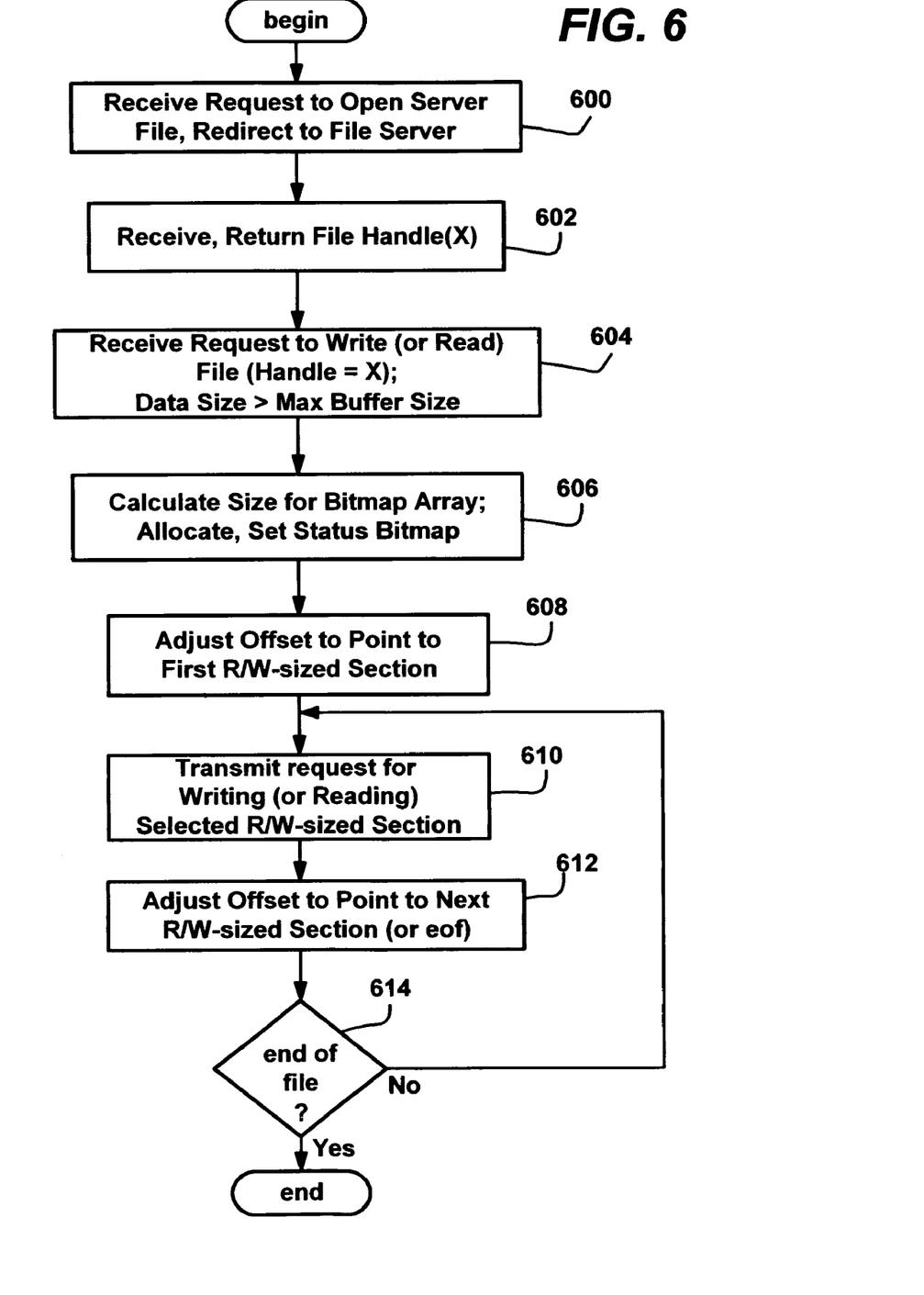
FIG. 6 is a flow diagram generally representing logic for sending pipelined I/O requests to a file server in accordance with an aspect of the present invention.
Figure 7:
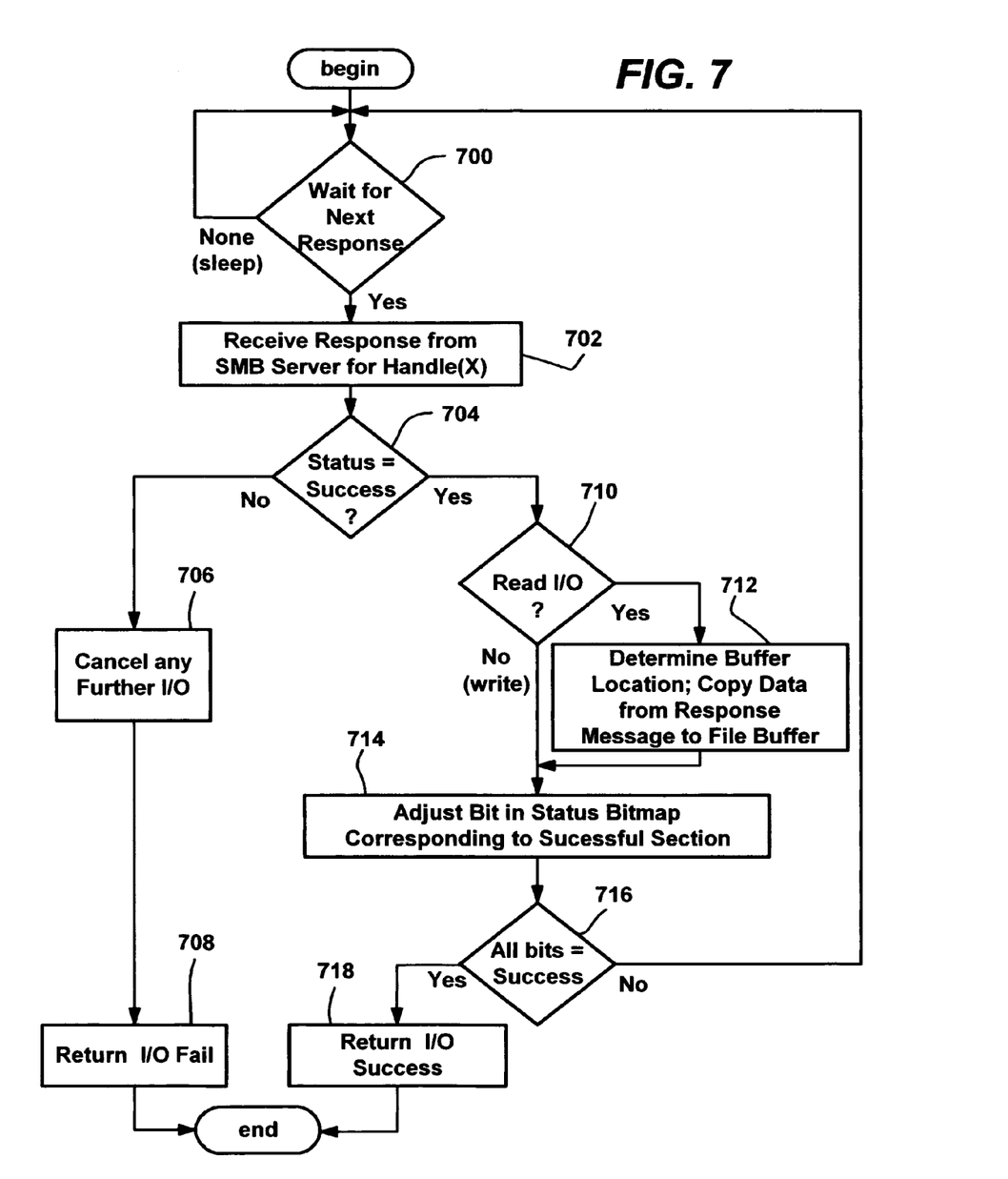
FIG. 7 is a flow diagram generally representing logic for handling responses from the server for pipelined I/O requests in accordance with an aspect of the present invention.

Turning to an explanation of the operation of the present invention with respect to FIGS. 6 and 7, FIG. 6 generally represents the operations taken to write (or read) a file or some part thereof to (or from) a file server, after the maximum buffer size has been negotiated. Step 600 represents the request to open (or create) a file being received at the redirector, which in turn redirects the request to the file server. At step 602, the file handle or identifier corresponding thereto is returned for this file, assuming for simplicity that no errors occurred.

Step 604 represents the receipt of a write or read file request on this file handle, at some later time typically determined by the application program, wherein the amount of data to write or read as specified in the request exceeds the maximum buffer size. Note that file I/O requests that do not exceed the maximum buffer size can simply be sent and tracked via a single response message, in the same way as before.

Step 606 represents the calculation of an appropriate size for the bitmap array based on the size of the file data that is being requested to be written or read, and the maximum buffer size. The values in this bitmap can be initialized as appropriate, e.g., set to one for bits that correspond to a file section, with any excess bits cleared to zero (as if their writes already succeeded).

Step 608 represents selecting the first section of the file, such as by adjusting an offset buffer pointer to the start of the buffer, while step 610 represents transmitting the I/O request to the file server. Note that write requests result in the data in this selected section being sent. Step 612 moves the offset to point to the next section, and along with step 614, which tests for the end of file, repeats the process until all sections have had a write or read request sent therefor, or total outstanding requests have reached maximum requests allowed. In this manner, the sections of a file are sent to or read from the server in a pipeline, without waiting for a response from the server related to another section.

FIG. 7 represents the handling of a response. Note that the steps of FIG. 7 can be performed at the same time that requests may be being sent via FIG. 6 by the use of a separate thread (or threads, e.g., one per response) or interrupt handler. Alternatively, the steps of FIG. 7 may be performed by testing for received responses within the loop of steps 610-614 and executing FIG. 7 whenever a response is received. In this way, responses may be processed without waiting for all the sections to be first sent in requests, which is more efficient in general and also can abort the requesting process in the event of an error. As yet another alternative, all requests can be sent before processing responses, as long as the responses are queued somewhere for evaluation.

As can be readily appreciated, read requests can be handled in a pipeline read operation in essentially the same manner as a pipeline write operation. In a read operation, however, the read buffer corresponding to the file sections is initially empty, and filled in as responses are received.

FIG. 7 represents the response handling portion of the mechanism, sleeping (or possibly looping) until a response is received as represented by step 702. Step 704 evaluates the status information in the response. If the status indicates an error occurred, steps 706 and 708 are executed to cancel and further write requests and return a write fail message (e.g., an I/O request packet indicating the type of failure to the I/O manager) that will reach the application program. The bitmap may be deallocated at this time.

If the status was successful at step 704, the process branches to step 710 to copy the data from the response to the file buffer at step 712 for read requests. Note that steps 710 and 712 can be executed elsewhere, such as in a different response handling mechanism than the one that tracks status, but are represented in FIG. 7 for completeness. Further, in keeping with the present invention, note that a read response can correspond to any section in the file, since responses are not necessarily received in the order they are sent. As a result, part of copying the buffer location includes determining the buffer location (offset) based on the sequence/position data that relates to this particular response.

In accordance with one aspect of the present invention, step 714 accounts for a successful status by adjusting (e.g., clearing) the bit in the bitmap corresponding to the successfully written or read section. Note that the section information (sequence/position number) may be extracted from or otherwise derived from the response message, as described above so that the location of the bit can be determined. Further, note that requests for different files may have been sent; the file handle information or the like that identifies the particular file (relative to other files) for which a response has been received can be used to select the correct bitmap.

Step 716 represents the test for whether all bits indicate that all sections have been successfully written or read. As described above, by clearing bits preset for actual sections, this may be a simple compare-to-zero operation regardless of the number of bits in the bitmap. If not yet completely successful, step 716 returns to step 700 to await the next response. If all bits indicate success, step 716 branches to step 718 to return the write or read success to the application program (e.g., via an I/O request packet sent to the I/O manager). The bitmap may be deallocated at this time.

It should be noted that the application program ultimately closes the file at some later time when desired, although this is not separately represented in FIGS. 6 or 7.

As can be seen from the foregoing detailed description, there is provided a method and system that facilitate pipeline input and output operations directed to file server files. The system and method provide dramatic increases in performance relative to prior art techniques for remote I/O.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer network, a method comprising: at a client-side redirector, receiving a write request to write file data to a file on a network server, the write request indicating an amount of data to be written that exceeds a maximum size allowed per request by the server; logically separating the write request into a plurality of partial write requests that each do not exceed the maximum size; allocating a data structure containing an entry for each partial write request; sending each of the partial write requests to the network server, at least one request being sent without awaiting a status response that results from a previously sent request; evaluating responses from the network server, and for each successful response that corresponds to a partial write request, updating the data structure in the entry therein that corresponds to that partial write request; and returning a success indication when the data structure entries indicate that each of the partial write requests was successful.

2. The method of claim 1 further comprising, receiving the maximum size from the network server.

3. The method of claim 1 wherein updating the data structure in the entry comprises determining an entry in an array via a value associated with each partial write request that differentiates that partial write request from other partial write requests, wherein the value is determined by evaluating the successful response.

4. The method of claim 3 wherein determining the entry comprises locating a position value in the response that identifies which partial write was successfully written.

5. The method of claim 3 wherein the array comprises a bitmap, and wherein updating the data structure comprises toggling at least one bit in the array, such that the data structure entries indicate that each of the partial write requests was successful when each of the bits of the bitmap that correspond to a write request have been toggled.

6. The method of claim 1 further comprising, calculating a size for the data structure based on the amount of file data.

7. The method of claim 1 wherein the write request corresponds to a non-buffered I/O request.

8. A recordable-type computer-readable medium having stored thereon computer-executable instructions, which when executed perform steps, comprising: receiving, at a client component, a write or read request directed to a file on a network server, the write or read request directed to communicating an amount of file data that exceeds a maximum size allowed for communicating file data in a request to the network server; logically separating the write or read request into a plurality of file section requests that each do not exceed the maximum size; sending each of the file section requests to the remote network server, at least one file section request being sent without awaiting a status response resulting from a previously sent file section request; and analyzing sets of response data corresponding to at least some of the file section requests, and if the status information from the sets of response data requests indicates that all file section requests were successful, returning a success indication in response to the write or read request.

9. The computer-readable medium of claim 8 wherein if the status information from the response data sets indicates that any file section request was unsuccessful, returning a failure indication in response to the write or read request.

10. The computer-readable medium of claim 8 wherein analyzing the response data sets comprises, determining, for each set of response data, to which file section that set of response data applies.

11. The computer-readable medium of claim 8 wherein returning the success indication comprises evaluating a data structure that maintains individual success statuses, each status corresponding to a set of response data for each write or read request.

12. The computer-readable medium of claim 11 further comprising updating the data structure as each set of response data is analyzed.

13. The computer-readable medium of claim 11 further comprising selecting the data structure based on a file handle associated with each set of response data.

14. The computer-readable medium of claim 8 further comprising notifying the server that the write or read request is part of a pipeline write or read request operation.

15. A recordable-type computer-readable medium having stored thereon computer-executable instructions, which when executed perform steps, comprising: receiving, at a client component, a first write or read request directed to a first file on a network server, the write or read request directed to communicating an amount of file data that exceeds a maximum size allowed for communicating file data to or from the network server; receiving, at a client component, a second write or read request directed to a second file on a network server, the second write or read request directed to communicating an amount of file data that exceeds the maximum size allowed for communicating file data to or from the network server; logically separating the first write or read request into a first plurality of file section requests that each do not exceed the maximum size; associating each request of the first plurality with a second file handle; logically separating the second write or read request into a second plurality of file section requests that each do not exceed the maximum size; associating each request of the second plurality with a second file handle; sending each of the file section requests to the remote network server, at least one file section request being sent that corresponds to the first file without awaiting a status response resulting from a previously sent file section request that corresponds to the first file; separating first sets of response data corresponding to the first file from second sets of response data corresponding to the second file based on file handle data returned with each set of response data; returning success for the first read or write request when all sets of response data corresponding to the first file indicate success; and returning success for the second read or write request when all sets of response data corresponding to the second file indicate success.

* * * * *

UNITED STATES PATENT AND TRADEMARK OFFICE
CERTIFICATE OF CORRECTION

| | | |
|---|---|---|
| PATENT NO. | : 7,359,903 B2 | Page 1 of 1 |
| APPLICATION NO. | : 11/252684 | |
| DATED | : April 15, 2008 | |
| INVENTOR(S) | : Yun Lin et al. | |

It is certified that error appears in the above-identified patent and that said Letters Patent is hereby corrected as shown below:

In column 1, line 3, below "Title of Invention" insert
-- CROSS-REFERENCE TO RELATED APPLICATION --.

Signed and Sealed this
Twenty-second Day of February, 2011

David J. Kappos
*Director of the United States Patent and Trademark Office*